(No Model.)
G. E. HAIN.
NUT LOCK.
No. 495,551. Patented Apr. 18, 1893.
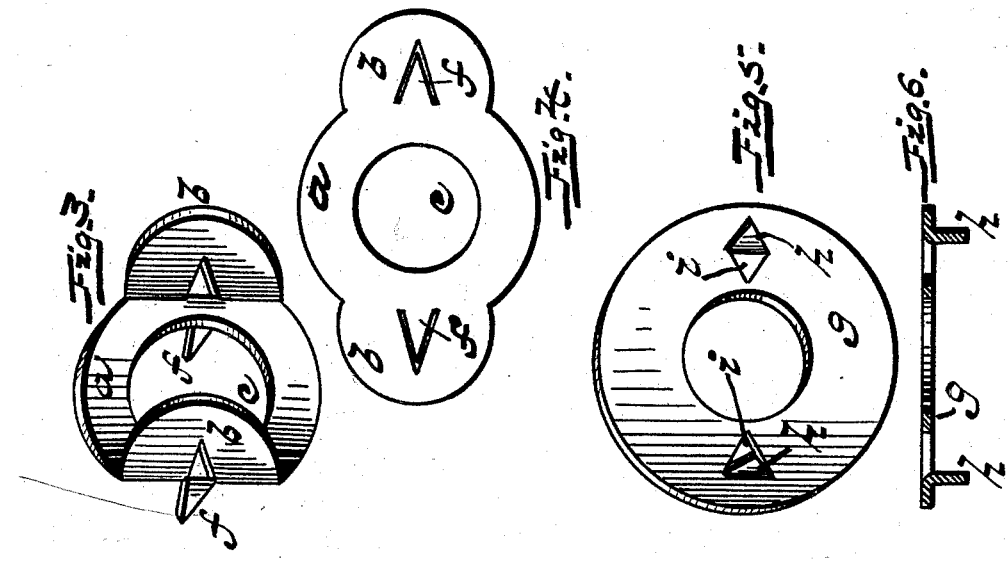
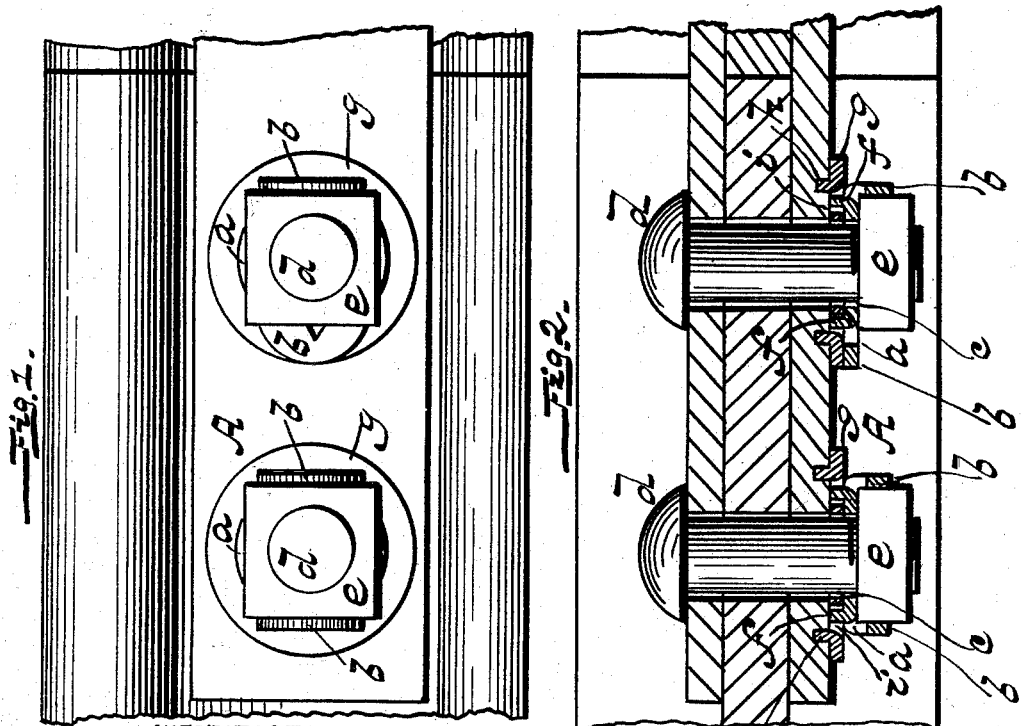
WITNESSES
Jas. B. Clarke
M. M. Morris
INVENTOR
G. E. Hain
by E. H. Bates, Attorney

United States Patent Office.

GARRETT E. HAIN, OF FREMONT, MICHIGAN.

NUT-LOCK.

SPECIFICATION forming part of Letters Patent No. 495,551, dated April 18, 1893.

Application filed January 31, 1893. Serial No. 460,249. (No model.)

*To all whom it may concern:*

Be it known that I, GARRETT E. HAIN, a citizen of the United States, residing at Fremont, in the county of Newaygo and State of Michigan, have invented certain new and useful Improvements in Nut-Locks; and I do hereby declare the following to be a full, clear, and exact description of the invention, such as will enable others skilled in the art to which it appertains to make and use the same.

My invention relates to nut-locks for railway uses, and analogous uses, and it consists in the construction and novel combination of parts, hereinafter fully described and claimed.

The annexed drawings, to which reference is made, fully illustrates my invention, in which—

Figure 1, represents a side view of portion of a rail showing my improvement attached. Fig. 2, is a longitudinal sectional view of the same. Fig. 3 is a perspective view of the locking plate. Fig. 4 is a view in plan of the same. Fig. 5 is a perspective of the ring and Fig. 6 is a sectional view of the same.

Referring by letter to the accompanying drawings, A, designates the nut lock consisting of a metal plate $a$ which is stamped or cut from sheet metal and is provided with the ears $b$, $b$, and the central opening $c$ for the passage of the bolt $d$ having the nut $e$ thereon. This plate $a$ is also provided with points or spurs $f$ on each side of the bolt hole and the same are formed integral with said plate, being stamped out and bent at right angles to the plate. A circular plate $g$, is provided, having a central opening for the passage of the bolt $d$. Said plate is also provided with spurs $h$ which are stamped from the plate, bent at right angles thereto, and are designed to enter the wooden fish plate of a rail joint or a hole or depression in a metal fish plate so that the plate is prevented from turning on the bolt. Thus it will be observed that after the plate or ring $g$, is applied to the bolt and the spurs thereof enter the fish plate, the nut locking plate is applied and forced against the plate $g$; the spurs $f$, entering the holes or openings $i$ in the ring, thus preventing the plate from turning in either direction; after which the nut $e$ is screwed on the bolt and up against the locking plate, binding the two plates against the fish plate of the rail and when in this position, the ears $b$, $b$, are bent outwardly and at right angles to the body of the locking plate and against the two sides of the nut, which prevents the latter from accidental displacement as the same cannot become unscrewed. The nut can be easily removed, when desired by simply bending back the ears $b$, $b$, to their normal position.

In some cases it is not necessary to use the ring in connection with the locking plate, as the plate can be made sufficiently heavy to act as a washer and yet permit of the ears being turned outwardly and up against the nut, and one or more ears may be provided to hold the nut in position.

The ring, in some cases may be constructed of cast iron, the spurs or points thereof being cast on the under side and holes or depressions provided on the outer or upper side to receive the spurs of the locking plate. Thus it will be seen that my device may be used with or without the ring aforesaid and on either wood or metal fish plates, and a device as herein described is durable as well as cheap to manufacture.

What I claim is—

The herein described nut-and bolt-lock consisting of the combination with the aligned rails having their webs provided with bolt-holes, and the fish-plates having bolt-holes in alignment with the bolt-holes in the webs of the rails, of the headed, threaded bolt, the flat ring $g$ having the bolt-opening and the integral spurs $h$ extending rearwardly from recesses $i$ in said ring, the plate $a$ having ears $b$ $b$ central opening $c$, and spurs $f$, $f$, extending rearwardly from said plate $a$, and the nut $e$, engaged by the ears $b$ $b$ of the plate $a$, substantially as and for the purposes set forth.

In testimony whereof I affix my signature in presence of two witnesses.

GARRETT E. HAIN.

Witnesses:
A. V. WHITE,
EMMA WALKER.